United States Patent

[11] 3,630,679

| [72] | Inventor | John C. Angus |
| | | Cleveland Heights, Ohio |
| [21] | Appl. No. | 740,228 |
| [22] | Filed | June 26, 1968 |
| [45] | Patented | Dec. 28, 1971 |
| [73] | Assignee | Case Western Reserve University |

[54] DIAMOND GROWTH PROCESS
14 Claims, 4 Drawing Figs.

[52] U.S. Cl. .................................................. 23/209.1,
23/209.9, 23/301, 252/502, 252/503, 117/46,
117/106, 117/226
[51] Int. Cl. .................................................. C01b 31/06
[50] Field of Search .......................................... 23/209.1,
209.9; 252/502, 503, 506, 508, 62.3 E; 117/1.5,
171, 174, 189

[56] References Cited
UNITED STATES PATENTS

| 3,030,188 | 4/1962 | Eversole | 23/209.1 |
| 3,134,739 | 5/1964 | Cannon | 252/503 |
| 3,148,161 | 9/1964 | Wentorf et al. | 252/502 |
| 3,268,457 | 8/1966 | Giardini et al. | 252/506 |
| 3,348,918 | 10/1967 | Kruse | 23/209.9 |
| 3,348,984 | 10/1967 | Pammer | 148/174 |
| 3,371,996 | 3/1968 | Hibshman | 23/209.1 |
| 3,473,974 | 10/1969 | Faust et al. | 252/62.3 |

*Primary Examiner*—Edward J. Meros
*Attorney*—McNenny, Farrington, Pearne and Gordon ABSTRACT: There is provided an improved process for the growth of diamonds from seed crystal with a gaseous monocarbon atom compound which is characterized by extremely low pressures not in excess of $1 \times 10^{-2}$ (Torr.) and at temperatures in the range of 800° to 1,450° C. Interesting products including semiconductors and colored diamond crystals may be prepared by "doping" the gas with certain materials.

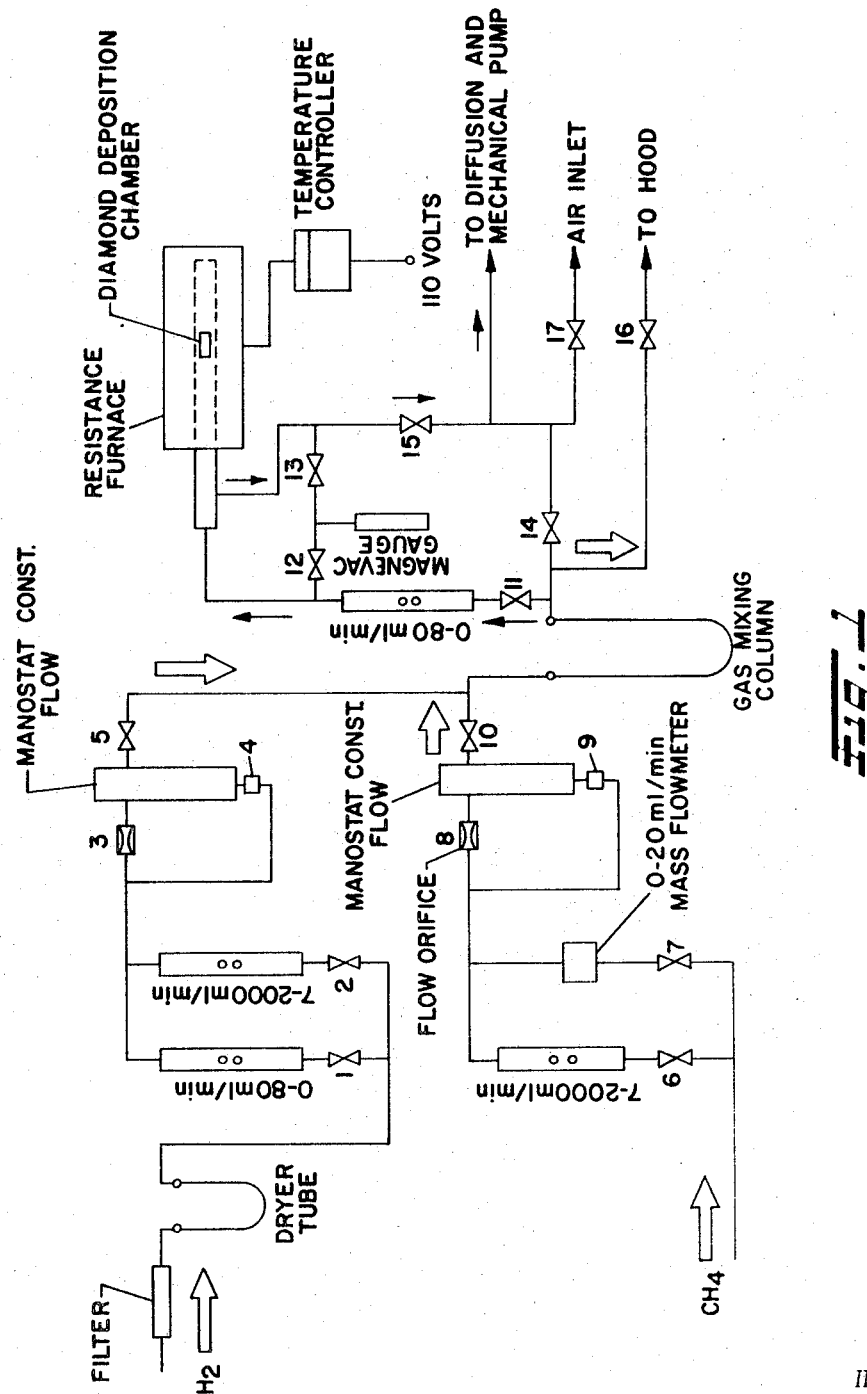

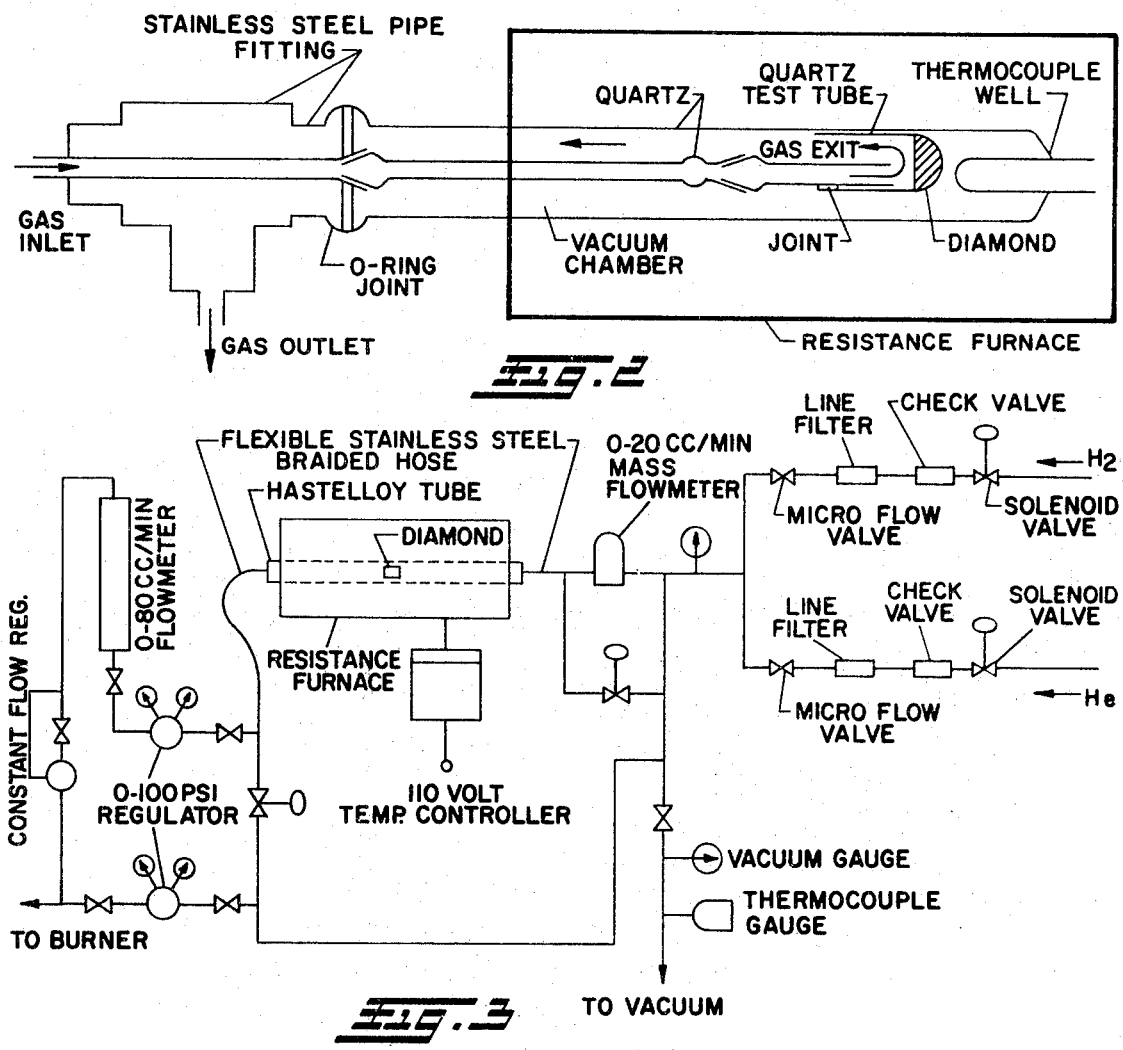
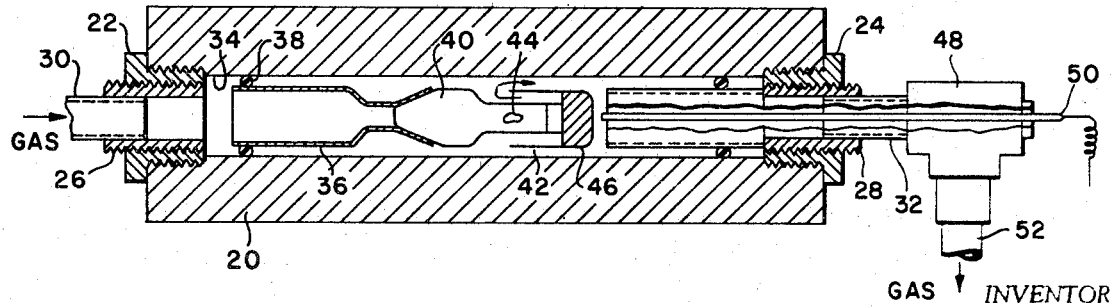

DIAMOND GROWTH PROCESS

This invention relates as indicated to an improved process for the growth of diamonds from seed crystals. It is to be distinguished from the production of industrial diamonds from carbon under conditions of extremely high temperature and pressure. It is also to be distinguished from processes which produce industrial diamonds from seeds at moderate to low pressures. This invention provides conditions for decreasing the rate of the undesired side reaction to graphite, for growing such diamonds of a perfect enough crystal structure so that they have application as semiconductors as well as abrasive materials, and for increasing the overall growth rate of diamond from seed crystals. The conditions which have been found to yield improvement in overall diamond yield and in crystal structure are relatively low temperatures in the range of from 800° to 1,450° C., and at pressures which are very much lower than have heretofore been used.

A primary difficulty with prior so-called low-pressure processes for the growth of diamonds is that the growth rate of unwanted graphite is too high. This invention provides means for suppressing the growth rate of graphite and at the same time producing diamond of improved crystalline quality.

The term "low pressure" insofar as it is applied to the production of diamond contemplates anything below 40,000 p.s.i. One "low-pressure" process (Hibshman U.S. Pat. No. 3,371,996) contemplates pressures of from 1 to 2,000 atmospheres, and temperatures which are limited to 1,100° C. or less. This process is characterized by utilization of a platinum catalyst to promote the production of carbon from carbon monoxide. The present improvements contemplate very much lower pressures, preferably a hydrocarbon source for the carbon and an absence of metallic catalysts. Another process (Eversole U.S. Pat. Nos. 3,030,187 and –188) contemplates temperatures in the range of from 600° to 1,600° C. and pressures of from 0.03 mm. Hg. to 10 atmospheres.

A special type of low-pressure carbon transport process is taught by Brinkman U.S. Pat. No. 3,142,539 which contemplates temperatures in the range of from 1,000° to 1,800° C., and a molten metallic medium for transporting carbon to the seed crystals. Brinkman in U.S. Pat. No. 3,175,885 discloses another carbon transport process utilizing a vapor transport for carbon evaporated from pure graphite at very high temperatures, distinguished by maintaining the seeds and carbon source at different temperatures.

As an example of an extremely high-pressure process, reference may be had to U.S. Pat. No. 3,334,968 to Ishizuka who contemplates pressures of 75,000 atmospheres. Also reference may be had to the patent to Wentorf U.S. Pat. No. 3,297,407 which utilizes seed crystals but extremely high pressures on the order of 75,000 atmospheres.

There are quite a few other patents which contemplate high-pressure equilibrium processes and these are exemplified by the U.S. Pat. Nos. to Darrow 3,310,501; Strong 3,303,053; Wentorf 3,142,595; Wentorf 3,148,161; Wentorf 3,181,933; Giardini 3,268,457.

As indicated, the present invention is distinguished from the prior art in that it uses in all cases an oxygen-free source for the carbon, uses extremely high-purity gases, and most particularly in the fact that the lowest pressures ever used in diamond growth processes are hereby contemplated. These conditions provide improved crystalline quality and improved diamond growth rates in part by suppression of the unwanted reaction to form graphite. Suppression of the graphite formation has two advantages. First, it permits significantly longer deposition runs without interruption for cleaning graphite from the samples. Secondly it permits shorter cleaning times e.g., if the amount of graphite is doubled, 29 additional minutes of cleaning is required when hydrogen at 1,030° C. and 50 atm. is used for graphite removal. The pressures contemplated are not in excess of $1\times10^{-2}$ (Torr.) and may go as low as $1\times10^{-8}$ (Torr.). Although rather sophisticated equipment is required to obtain pressures as low as $1\times10^{-8}$ (Torr.), it is commercially available.

The present process contemplates temperatures within the range of from 800° to 1,450° C. Under the conditions of the present process it has been found that diamond is not produced at appreciable rates at temperatures above 1,450° C. nor it is produced at appreciable rates at temperatures below 800° C. Preferably, the temperatures are maintained in the range of from about 1,030° to about 1,250° C. Induction heating means may be employed if desired, although satisfactory temperature control is obtained with resistance heaters. Also the present process contemplates very low levels of impurities, especially $H_2O$ and $O_2$ which are not well tolerated above levels on the order of 3 to 50 p.p.m. The presence of impurities in the vapor phase decreases the diamond yield, decreases the overall rate, and decreases the crystalline perfection.

Diamonds which are produced in accordance with the process of this invention may be used as conventional industrial diamonds are used; for example they may be used in abrasive wheels or tools. Embodiments of the process of the present invention, as indicated above, also yield diamonds which are semiconducting, and of such a quality that they may be used in electrical circuits where retention of semiconducting properties at high temperatures is required, for example, in diode rectifiers. Also, these diamonds so produced may be colored by the introduction of "doping" agents and have utility in the gemstone field.

Equipment which may be used in carrying out the process of this invention is shown in diagrammatic and schematic form in the annexed drawings.

FIG. 1 shows apparatus diagrammatically and schematically in which the growth of diamond crystals from seed crystals may be performed.

FIG. 2 is a diagrammatic illustration of a quartz vacuum chamber in which the diamond growth occurs.

FIG. 3 shows equipment in diagrammatic and schematic form in which the cleaning of the seed crystals with hydrogen may be carried out.

FIG. 4 illustrates the detail of the furnace for cleaning diamonds with hydrogen.

Briefly stated, therefore, the present invention is in a process for growing diamond from a seed crystal preferably diamond seed crystal which comprises the steps of providing a seed crystal and contacting such seed crystal with a gas comprising an oxygen-free compound of carbon containing a single atom of carbon per molecule, which gas is free of molecular oxygen and water vapor. The temperature at which this gas contacts the seed crystal is in the range of from 800° to 1,450° C., and the pressure at which this reaction is carried out is not in excess of $1\times10^{-2}$ (Torr.). (One Torr. is equal to one millimeter of Hg). Natural diamond seed crystals are preferred, but synthetic diamond seeds may be used. The graphite formation reaction is suppressed but not normally completely eliminated. It is therefore necessary to remove selectively by reaction with hydrogen or oxygen or by volatilization any graphite formed.

Referring now more particularly to FIGS. 1 and 2, equipment useful for diamond growth in accordance with this process includes gas supplies for methane, for example and hydrogen, flow and pressure controls, and a furnace. The hydrogen can be purified with a platinum catalytic reactor or a palladium diffuser and drier tube. Hydrogen flow, when it is used, is controlled by a Cartesian diver manostat or a capacitance manometer flow regulator and a needle valve 5. Thus, for a particular setting of needle valve 5, the flow will be a constant independent of upstream or downstream pressure fluctuations. The flow system for the methane is the same as that for hydrogen except that a deoxygenating catalytic reactor and drier tube were not used. Methane of the highest available purity is used, e.g. 99.99 percent $CH_4$, dew point approximately −100° F., 3 p.p.m. $O_2$ and 15 p.p.m. $N_2$. The flow system is vacuum tight to prevent any air from entering. A mass flowmeter replaced the low range flowmeter in the hydrogen line. The mass flowmeter was used for more accurate measure of the very low-methane flow rates.

If a plurality of gases is used, for example hydrogen or helium in combination with methane in a mole ratio of from 100:1 to 1:100, the gases are thoroughly mixed in a column filled with glass beads. Doping gases are mixed in the same way. Since a high flow of gas may be required to obtain various methane to diluent gas ratios within the above range, a large portion of the gas is vented by means of valve 16 into a fume hood where it is burned off. A small portion of the gas is metered into the quartz diamond deposition chamber through valve 11 which reduces the pressure from approximately 3 p.s.i.g. to the operating pressure of the pressure system. After passing over the seed crystals in the diamond deposition chamber, the gas is exhausted through a diffusion pump. The operating pressure in the system is controlled by adjusting the downstream needle valve 15. Pressure in the diamond deposition chamber is measured by electronic means.

The diamond deposition chamber is best illustrated in FIG. 2, and shows its disposition in the resistance furnace and the fact that the component parts within the furnace are formed from quartz. The temperature is measured by means of a thermocouple inserted in a thermocouple well in close proximity to the sample chamber.

As shown if FIG. 2, diamond seed crystal powder is placed in the bottom of the quartz test tube so that the gas flows along a path through a quartz joint, over the diamond seed crystals, and out the top of the test tube. The test tube and the quartz gas inlet tube are jointed together near the lip of the test tube to make it easier to slide the assembly into the vacuum chamber. It is preferred that the gas not flow through the diamond powder because it has been found that this causes too large a pressure drop across the seed crystal bed. Such a pressure drop may cause diamond powder to be blown out the sample chamber.

In order to grow high-quality crystals at useful yields and growth rates, it is necessary that the entire deposition system is vacuum tight. Great care must be exercised to eliminate all leaks which permit the entrance of air ($N_2$, $O_2$, $H_2O$ and $CO_2$) into the system.

The temperature of the diamond seed crystal is maintained at a constant level by a 24-inch long electrical resistance furnace. The temperature profile along the length of the furnace is adjustable by means of electrical shunt taps on the back of the furnace, not shown. By adjusting the shunts across these taps, the temperature profile was made flat to within 5 inches of the ends of the resistance furnace. This flat temperature profile allows the temperature of the gas to approach equilibrium before it reaches the diamond seed crystal. A proportional band power controller is conveniently utilized to maintain the temperature within plus or minus 0.2° C. of the set point.

Referring now to FIG. 3, there is here shown a flow diagram for an apparatus for cleaning diamond seed crystals with hydrogen under pressure, e.g. 50 atmospheres. This is but one of several methods of cleaning graphite which may be used in conjunction with the process hereof. Graphite is selectively removed from the diamond seed crystals by reaction with hydrogen at pressures on the order of 50 atmospheres, and temperatures on the order of 1,000° C. The cleaning reaction is just the reverse of the methane reaction used for depositing diamond. It has been found that the rate of reaction of diamond with hydrogen at these pressures and temperatures is about 3 orders of magnitude less than the rate of reaction for hydrogen with graphite under the same conditions. Thus, graphite may be removed from diamond with very little loss of diamond. The reaction time for cleaning a supply of diamond seed crystals is about 7 hours. Under these conditions, it has been found that 99.9 percent of the graphite is removed while the weight of the diamond mass will decrease by less than 0.3 percent.

In carrying out the cleaning operation, hydrogen is contacted with the diamond seed crystals contained within a "Hastelloy" tube 36 inches long, 2 inches in diameter and having an 11/16 inch hole bored through the center. Hose connections are made to each end of the tube, and various flow control regulators and pressure gauges included in the line as shown in the diagram.

FIG. 4 shows in greater detail the furnace for cleaning diamonds with hydrogen under pressure.

Referring to FIG. 4, there is provided a bored steel tube 20 fitted with end bushings 22 and 24, and having threaded nipples 26 and 28 extending therefrom. Nipples 26 and 28 are attached to receive entering gas tube 30 and outlet gas tube 32. Thus, the bore 34 is closed except for the gas inlet and gas exit means. Disposed within the bore 34 is an adapter 36 frictionally retained within the bore 34 by means of a high temperature resistant O-ring 38, and adapted to receive the diamond sample assembly composed of a glass joint member 40 and test tube 42 secured together by sealing the tube 40 to the test tube 42 at point 44. The diamond sample 46 is disposed in the bottom of the tube. Gas entering through inlet tube 30 passes through adapter tube 36 and joint 40, flows across the diamond sample 46 and exits around the lip of the tube 42, and then passes out through the outlet gas line 32. An adapter 48 is provided to allow removal of the gas and also to provide for the introduction of a thermocouple 50 to measure the temperature of the system.

The most essential part of the cleaning apparatus is the reaction tube which must withstand pressures of at least 100 atmospheres of hydrogen at temperatures up to about 1,100° C.

In general, a useful procedure for cleaning the diamond powder is as follows: The diamond sample is placed in the sample chamber or tube 42, and the sample tube 40–42 assembled with the adapter 36 and inserted in the reaction tube 20. A stainless steel tube is connected to the inlet tube 30 and a stainless steel hose connected to the exit 52. The apparatus is evacuated to less than 10 microns through the vacuum line indicated in FIG. 3. The apparatus is then pressurized with 50 atmospheres of hydrogen and the temperature in the reaction tube 20 elevated to 1,032° C. where it is maintained for a period of 7 hours. The furnace is then cooled and the hydrogen vented. A vacuum is again pulled on the system and the system filled with helium to atmospheric pressure. The diamond sample is then removed from the tube.

The diamond seed crystal samples which are used in this invention are in the form of natural diamond powder having a particle size of 0 to 1 micron or from 1 to 5 microns. Industrial diamond such as this material is contains metallic impurities along with a small amount of graphite. Most of the metallic impurities can be removed by pretreatment of the diamond powder with aqua regia. Certain impurities such as tungsten oxides can be removed only with hydrofluoric acid.

A typical procedure for initial or precleaning of the diamond powder is to add aqua regia to the diamond powder at room temperature and maintain the diamond powder submerged therein for a period of 24 hours after which time the sample is rinsed. The diamond powder is then treated with concentrated hydrofluoric acid in a polyethylene container for an additional 24-hour period at room temperature. The acid is decanted and the powder thoroughly rinsed with distilled water. The powder is then transferred to a glass test tube and dried by heating to a temperature not in excess of 100° C. At this point, the diamond powder can be submitted to the high-pressure hydrogen cleaning process.

In all the deposition runs the deposit is identified as new diamond by the following series of experiments: chemical analysis for carbon; precision density measurements; X-ray and electron diffraction; chemical etching with $H_2SO_4$-$HNO_3$ solutions; etching with aqua regia; microwave absorption; and electron spin resonance. In all runs the results are consistent only with the deposit being new crystalline diamond of high crystalline perfection and quality. Typical results of these studies are shown in table I and table II. The results show that the observed diamond growth is of a high quality with few voids and defects in the diamond lattice. No evidence of any amorphous or graphitic carbon is found. Diamonds of high perfection are required in order to find application as semiconductors and as gemstones.

TABLE I

Typical properties of diamond crystals after deposition compared with accepted values for diamond from the literature

| | Measured | Theoretical |
|---|---|---|
| Density | 3.511[a] | 3.515 g./cm.$^3$ |
| Carbon content | 99.6%[b] | 100.0% |
| Lattice plane spacing from X-ray diffraction | 1.26[c] | 1.262 |
| Lattice plane spacing from electron diffraction indices (111) | 2.063[d] | 2.060 |
| (220) | 1.268 | 1.262 |
| (400) | 0.892 | 0.892 |

[a] measured using a 2 ml. pyncnometer with deaerated orthoxylene as the cover liquid.

[b] carbon and hydrogen analysis done by standard microanalytical combustion techniques; metal analysis by an emission spectrograph. (balance of 0.4 percent adsorbed hydrogen plus trace metallic impurities).

[c] Debye-Scherrer camera, λ=2.29092 A, 20 hour exposure times.

[d] 100 kv. electron beam, λ=0.0388 A.

TABLE II

COMPARISON OF EXPERIMENTAL RESULTS ON VIRGIN DIAMOND, DIAMOND PLUS AMORPHOUS (GRAPHITIC) CARBON AND DIAMOND PLUS NEW DIAMOND DEPOSIT

| Experiment | Virgin diamond | Diamond plus amorphous (Graphitic) carbon | Diamond plus new diamond deposit |
|---|---|---|---|
| Etch with H$_2$SO$_4$—HNO$_3$ at 100°C. for 10 hours | no weight loss | Deposit completely removed | No weight loss. |
| Etch with aqua regia at 25°C. for 15 hours | do | | Do. |
| Microwave absorption | Relative conductivity of 15 | Relative conductivity of 33 | Relative conductivity of 13. |
| Electron spin resonance spectrum | A triplet was observed | | Spectrum identical to virgin diamond spectrum. |

TABLE III

Effect of total pressure on diamond yield

| CH$_4$ Pressure (Torr.) | Yield of Diamond (% of total deposit) |
|---|---|
| 49.2* | 12.8% |
| 0.90 | 0.9% |
| 0.35 | 25.1% |
| 0.007 | 46.7% |
| 0.0001 | 90.0% (est.) |

*Partial pressure. Total pressure in this example is 458 Torr. with the remainder being hydrogen.

It is significant to note that even at the very much higher pressure, the use of hydrogen in combination with the carbon source material improves the diamond yield and offsets the deleterious effects of relatively high-gas pressure.

EXAMPLE 2

According to the present example, diamond seed crystals

The following examples of specific embodiments of the invention are for purposes of illustrating the invention and are not intended as limitations thereon.

EXAMPLE 1

Ultra pure methane is used without further purification. The chemical analysis of the methane is 40 p.p.m. CO$_2$, 2.5 p.p.m. O$_2$, 13.6 p.p.m. N$_2$, 2.8 p.p.m. C$_2$H$_6$, less than 5 p.p.m. C$_3$H$_8$, 99.95 volume per cent CH$_4$. According to the present example, diamond seed crystals are submerged in aqua regia at 25° C. for a period of 24 hours, rinsed, and then submerged in hydrofluoric acid at 25° C. for a period of 24 hours and again rinsed and dried. The sample is then submitted to treatment with hydrogen gas at 50 atmospheres pressure and 1,033° C. for a period of 7 hours to clean the diamond seed crystals. The methane gas is passed over the seeds at a temperature of 1,052° C. and a total pressure of 7 microns (7×10$^{-3}$ Torr.) for 47 hours. A total of 9.0 mg. mass increase is observed. After cleaning with H$_2$ for 7 hours at 1,033° C., a net increase in mass of the diamond of 4.2 mg. is observed. In other words, 42 percent of the total deposit was new diamond. In contrast, a run performed at 1050° C. and 0.35 Torr pressure gave a yield of only 25.1 percent new diamond. A run performed at a pressure of 0.9 Torr at a temperature of 1,050° C. gave large amounts of sooty graphite all over the diamond seed crystals and the quartz deposition chamber. This sooty deposit was quite difficult to remove. At this higher pressure (0.9 Torr), only 0.1 mg. or 0.9 percent of the total deposit was new diamond. At still lower pressures, e.g. 10$^{-4}$ (Torr.), further increases in yield are obtained as indicated in table III, and graphite formation is reduced.

are submerged in aqua regia at 25° C. for a period of 24 hours, rinsed, and then submerged in hydrofluoric acid at 25° C. for a period of 24 hours and again rinsed and dried. The sample is then submitted to treatment with hydrogen gas at 50 atmospheres pressure and 1,033° C. for a period of 7 hours to clean the diamond seed crystals.

In order to obtain oxygen-free and moisture-free methane gas, the methane gas of the highest purity commercially available is passed through a molecular sieve to remove water. The gas is then passed through a quartz tube coated with a titanium "getter" in order to remove oxygen, nitrogen and residual water. The titanium getter means is not shown in the drawings, it being a thin vapor deposited coating on the inner wall of a quartz tube.

The purified, oxygen-free and moisture-free methane is then continuously passed over the diamond seed crystals in an apparatus such as shown in FIGS. 1 and 2 for a period of 72 hours. The pressure within the vessel containing the diamond seed crystals is maintained at 1×10$^{-4}$ (Torr.) by needle valve 11 and temperature as recorded by the thermocouple 50 is 1,050° C.

No graphite is deposited on the quartz walls of the chamber and very little on the diamond seed crystals. Visual observation of the darkening of the seed crystals permits one to detect graphite in amounts as low as 0.3 percent.

Following this procedure, increases in weight similar to those obtained in example 1 are obtained.

Yields generally range from 25 to 80 percent. Determinations on weight increase are made after the diamonds have been submitted again to a cleaning treatment with hydrogen under the same conditions that the seed crystals were cleaned immediately prior to treatment with hydrocarbon gas. It has also been found that halogen-containing compounds of monocarbon molecules may also be utilized as a source of carbon in accordance with this process.

EXAMPLE 3

A sample of diamond seed crystals is cleaned following exactly the same procedure as given in example 1. To purify the gas used to treat the seed crystals, an inert gas, for example helium, is passed over heated copper chips at 500° C. The gas pressure is one atmosphere or less. The inert gas is then cooled by passing it through a quartz tube immersed in an ice water bath. The inert gas thus cooled is then passed over solid $CCl_4$ chunks maintained at −50° C. The partial pressure of the $CCl_4$ in helium gas is about 1 (Torr.).

The carbon tetrachloride-inert gas mixture is then expanded through a valve so that the total pressure is $1 \times 10^{-3}$ (Torr.) or less. The gas mixture is then continuously passed through a tube coated with a titanium getter to remove oxygen, nitrogen and water.

Using an apparatus such as shown in FIG. 2, the carbon tetrachloride-inert gas mixture is passed over the diamond seed crystals for a period of 24 hours. The temperature is maintained at 1,200° C. Following the growth procedure and although graphite formation is slow, the seed crystals are then treated with hydrogen at 50 atmospheres pressure and 1,033° C. for 7 hours to remove any graphite. Following this procedure, growth results similar to those in example 1 are obtained. With longer exposure periods, increased growths may be experienced.

Other gases may be substituted for carbon tetrachloride. For example, chloroform, dichloromethane or tetrafluoro methane may be used. Also methane may be used in place of the He in this example to provide a mixture of two carbon-containing gases. Thus a mixture of $CCl_4$ and $CH_4$ in a 1:1 ratio may be substituted for the $CCl_4$—He mixture, and the same conditions observed. The yield is of the same order.

EXAMPLE 4

A sample of diamond seed crystals is cleaned following exactly the same procedure as in example 2. The methane gas is also purified in the same manner as in example 2. The purified methane is then continuously passed over the diamond seed crystals for 96 hours. The pressure within the chamber is maintained at $10^{-5}$ (Torr.) by careful adjustment of needle valve 11 and use of diffusion pump. The temperature is maintained at 1,200° C. To obtain temperatures about 1,050° C. it is convenient to use an induction heater rather than a resistance furnace.

Following this procedure, increases in weight comparable to those in example 1 are found. At these conditions very little graphite will be observed on either the quartz walls of the chamber or on the diamond seed crystals. Short cleaning times are possible, e.g. 1 hour treatment with hydrogen at 1,050° C. and 50 atm. Deposition times even longer than 48 hours can be used.

EXAMPLE 5

It is not necessary that hydrogen at 50 atmospheres be used to clean off the unwanted graphite from the diamond seed crystals. Oxygen-containing gas (e.g. oxygen-helium mixture or pure $O_2$) at subatmospheric pressure can be used. High-overall rates of diamond growth are obtained in a single apparatus by alternately depositing carbon and then cleaning the surface with $O_2$, followed by $H_2$ reduction of the surface at low pressures. This process is not practical if large amounts of graphite are present, i.e. if the carbon deposition is done at too high a pressure. It is useful where the amount of unwanted graphite is low. The initial cleaning procedure for the diamond seed crystals is the same as that stated for example 2. Also, the purification procedure for the methane gas is the same as stated in example 2.

In this example, the purified methane gas is passed continuously over the diamond seed crystals in an apparatus such as shown in FIG. 2 for 1 hour at 1,300° C. and a pressure of $10^{-3}$ (Torr.). Thereafter, the flow of methane gas is discontinued, and oxygen gas is passed over the diamond seed crystals for a period of 0.5 hour at 1,300° C. and $1 \times 10^{-2}$ (Torr.) for the purpose of preferentially removing graphite. The flow of oxygen gas is discontinued and hydrogen gas is then passed over the diamond seed crystals for 0.5 hour at 1,300° C. and $1 \times 10^{-2}$ (Torr.).

In general, this process is practiced with the oxygen-containing gas flow maintained for from 0.1 to 1.0 hour at a temperature in the range of 1,050° to 1,350° C. and a pressure in the range of $1 \times 10^{-1}$ (Torr.) to $1 \times 10^{-8}$ (Torr.).

The apparatus is then evacuated and the preceding steps of passing the methane gas over the seed crystals, removal of graphite with oxygen and flushing with hydrogen gas repeated until the desired mass increase in weight is obtained.

The foregoing example illustrates a process which is advantageous in respect of the cleaning procedure because the cycles can be carried out repeatedly, and a single piece of equipment may be used instead of apparatus limitations necessitating transferral to a separate hydrogen cleaning apparatus such as shown in FIGS. 3 and 4.

EXAMPLE 6

This example illustrates the use of doping materials as components in the gas mixture for contacting with the seed crystals in the extremely low pressures of the present invention.

The procedure is identical with the procedure of example 2 with the exception that a gas mixture of 1.0 mole percent of $B_2H_6$ in the methane is passed over the seed crystals at a temperature of 1,050° C. and a pressure of $2 \times 10^{-1}$ (Torr.) for a period of 24 hours. The diamond crystals are then cleaned with hydrogen at a temperature of 1,033° C., a pressure of 50 atmospheres, for a period of 7 hours, in an apparatus such as shown in FIGS. 3 and 4 to remove any graphite formed during the process. Net weight gains on the order of those observed in example 1 are found.

Spectroscopic chemical analysis shows the presence of 0.01 percent boron in the diamond. The diamonds that have been grown in the presence of boron are darker-colored than those grown from a boron-free gas phase. Electron spin resonance measurements of the boron-doped diamonds show significant differences from the spectra obtained on the boron-free diamond. Examination of the crystals by Debye-Scherrer X-ray powder pattern diffraction techniques (20-hour exposure times) shows no sign of the unwanted $B_4C$ crystalline phase.

Instead of diborane ($B_2H_6$), other boron-containing compounds may be used, for example the boranes including $B_4H_{10}$, $B_5H_9$, $B_6H_{10}$, $B_{10}H_{14}$, etc. Also, the halogenated boranes such as $B_2H_5Br$, $B_2H_5Cl$, $B_2H_5I$, as well as the completely halogenated compounds such as $BCl_3$, $BBr_3$, $BBr_2I$, $BBrI_2$ and $BI_3$ may be used.

EXAMPLE 7

This sample illustrates the use of aluminum as a doping agent.

The initial cleaning of the diamond seed crystals is the same as given in example 1. To introduce aluminum chloride, an inert gas, i.e. helium, is passed over solid aluminum chloride held at approximately 150° C. The pressure of the inert gas is 1 atmosphere or less. To prepare the methane gas to include the doping agent, aluminum in the form of aluminum chloride, the methane is mixed with the inert gas so that the total concentration of the aluminum chloride in the methane is equal to 0.1 mole percent. This mixture of gases is passed over the diamond seed crystals held at a temperature of 1,100° C. The gas pressure is $10^{-4}$ (Torr.).

The total exposure time is 48 hours. After exposure to the doped methane gas, the diamond crystals are found to have increased in weight in the range of those of example 1 and are submitted to a cleaning operation such as described in example 6 above. Thereafter, the crystals are immersed in aqua regia at 25° C. for a period of 24 hours to yield a final product in which aluminum is included in the crystal lattice.

Alternate sources of aluminum may be used. These include among others triethyl aluminum, trimethyl aluminum, aluminum tribromide, and aluminum triiodide. Also, an electrically heated aluminum wire may be used. The wire is heated for 2.0 to 200 millisecond intervals by means of a capacitance discharge.

EXAMPLE 8

The present invention can be used as a technique for forming a matrix of tightly bonded diamond particles. The cleaning of the seed crystals and the gas purification are performed as in example 1. The diamond seed crystals are compacted together in the deposition chamber so there are many points of contact between the crystals.

The diamond powder can be pressure-compacted in the form of a disk or sphere or other shape by conventional compacting procedures. The deposition and the cleaning after deposition proceed as in example 1. The diamond seed crystals, after the removal of any graphite, are in the form of a diamond matrix with strong bonds between the previously unattached particles. The bonding between the particles is strong.

The matrix-forming process appears to be a joining together of the original separate diamond seed crystals by a bridge of strong new diamond at or near the points of contact in the original compact. The diamond matrices may have utility in abrassive applications. For example, the diamond matrix can be impregnated with a carbide-forming metal to form tough, bonded composite diamond grinding wheels.

Addition of certain diluents to the methane (or other gaseous source of carbon) also suppresses the relative rate of formation of graphite. For example, an equimolar mixture of hydrogen and methane is one combination of gases useful in accordance herewith. The hydrogen is purified by passing through a platinum catalytic reactor followed by a drying tube. The methane may be purified as described in example 2. The gases are mixed in gas-mixing column shown in FIG. 1. Excess gas is vented through valve 16. The rest of the gas flows through valve 11 and the flowmeter into the deposition chamber. The pressure of the gas is maintained within the range of $1 \times 10^{-8}$ to $1 \times 10^{-2}$ (Torr.) by adjustment of valve 11. The temperature is maintained in the range of 900° to 1,450° C. by means of an induction heater. Any graphite (or amorphous) black carbon observed on the diamond seed crystals may be removed by the cleaning procedure described in example 1. Similar weight gain is observed of which a significant amount is new diamond.

Other gas phase compositions may be used. For example mole ratios of $CH_4$ to $H_2$ ranging from 100 to 0.01 will reduce the rate of graphite formation. However, we observe at the lower ratios, e.g. 0.01, the rate of diamond formation becomes negligible and below this value it even becomes negative. Helium or other inert gases may be substituted for hydrogen. However, we observe inferior growth rates and often mass decreases when inert gases are used. This is believed to be caused by the presence of small amounts of $O_2$ in the He.

Seed crystals other than diamond can be used. For example, diamondlike deposits are observed when silicon carbide crystals are used as the seed crystals rather than diamond. The advantage of using seed crystals other than diamond is their lower cost.

EXAMPLE 9

This example illustrates the use of low-pressure hydrogen as a means for cleaning the seed crystals having the diamond deposition thereon together with unwanted graphite.

The conditions are those which are set forth in example 5. At the conclusion of the deposition run, hydrogen gas at a pressure of 700 (Torr.) is introduced and maintained for a period of 0.5 hour at 1,300° C. The system is evacuated, and the deposition procedure of example 5 is repeated.

Advantages of this procedure are that the cleaning procedure is accomplished in the same apparatus, and no oxygen or water is introduced into the system.

This procedure also allows the reduction of the time cycle from 1 hour as set forth in example 5 to a matter of minutes or even seconds whereby only minute quantities of graphite are permitted to form, and growth of graphite on the graphite nucleii is held at a minimum. The removal of the nucleii is much more easily accomplished at very short time cycles alternating between hydrogen gas as a cleaning agent and methane gas as a source of carbon for diamond deposition.

EXAMPLE 10

This example illustrates the use of extremely low pressures and elevated temperatures as a means of cleaning the seed crystals between diamond deposition cycles and without the use of different apparatus. The procedure for deposition in accordance with example 2 is carried out for a period of 0.2 hour. Thereafter, the system is evacuated to a pressure of $1 \times 10^{-9}$ (Torr.), and the temperature increased to 1,400° C. Even lower pressures may be used. In fact, the lowest possible pressure on the system is desired. The temperature of 1,400° C. is about as high as can be tolerated under the conditions without loss of deposited diamond.

Thereafter, the deposition procedure is again repeated under the conditions as given in example 1 for a period of 0.2 hour. The length of time at the extremely low pressure of $1 \times 10^{-9}$ (Torr.) and the temperature of 1,400° C. is that which is required to reach the temperature from 1,050° C. and to reach the pressure with the equipment utilized in example 2. Immediately thereafter, the temperature is allowed to decrease spontaneously to the 1,050° C. operating temperature of example 2 while maintaining the exceedingly low pressure of $1 \times 10^{-9}$ (Torr.). A total of 0.5 hour is contemplated for a full deposition cleaning.

This procedure has several advantages. It eliminates the use of hydrogen or oxygen for cleaning and also eliminates the use of separate apparatus for the cleaning operation. Even shorter cycle times may be used in the same manner as indicated in example 12 above. The small graphite nucleii vaporize more readily than larger particles of graphite which are grown about such nucleii. Thus, the shorter contact times prevent growth of graphite nucleii and make available the more ready vaporization of graphite nucleii as a means for cleaning intermediate diamond deposition cycles. Thus, the quality of the diamond product is improved. In general, the diamond deposition portion of the cycle is maintained for a period of time in the range of from $1 \times 10^{-4}$ to 1 hour. The low pressure-high temperature cleaning portion of the cycle takes place over a period in the range of from $1 \times 10^{-4}$ hour to $1 \times 10^{-1}$ hour.

Another method which may be used to clean the diamond surface is by the use of electron or iron bombardment. The process will clean the surface of the diamond, removing the graphite which has nucleated on the diamond surface. The static pressures should be very low during this type of cleaning, e.g., on the order of $10^{-8}$ (Torr.) to $10^2$ (Torr.).

It has been found that oxygen and $H_2O$ as impurities in the gases drastically reduce the formation rate of diamond and accordingly great care must be exercised to avoid the presence of either oxygen or $H_2O$ in the gases in the presence of the seed crystals. Hydrogen in small amounts, on the other hand, apparently acts as a selective catalyst in promoting the deposition of diamond on the seed crystals. Hydrogen retards the formation of graphite and apparently enhances the relative rate of formation of diamond up to a point. Accordingly, in preferred embodiments of the invention, it is desired that hydrogen be present either by virtue of the decomposition of the carbon source material or by addition of hydrogen to the gas stream. Moisture which, under the conditions of the process, provides oxygen in the system, is to be avoided. Best results in removing moisture are obtained through the use of acetone/dry ice or n-pentane/liquid nitrogen cold traps.

Valuable products, particularly semiconductor products, may be prepared by "doping" the inlet gas with controlled amounts (from 0.0005 by volume to 1 percent by volume) of materials which will enter into the diamond lattice and create either color or semiconducting properties, or both, upon the final product. For example, boron hydride, $B_2H_6$, may be used to produce semiconductors, and the procedure is quite simple, simply by introducing boron hydride into the gas stream in an amount within the range above-stated, for example 0.001 percent by volume. There may be substituted for the boron hydride, boron trichloride and the other higher molecular weight boranes, e.g. $B_4H_{10}$. Other materials useful in this connection include compounds of aluminum, phosphorus, and lithium, or combinations thereof. The aluminum compounds, lithium compounds, and phosphorus compounds are preferably in the form of organometallic derivatives such as trimethyl aluminum, triethyl aluminum, lithium methyl, lithium ethyl, etc.

All of the products of the present invention may, of course, be used in the production of abrasive tools or wheels by procedures which are well known.

Instead of diamond seed crystals, other seed nucleii may be used. These include silicon carbide and boron nitride (cubic form) and are used in the same manner as the diamond seed crystals. Natural diamond seed crystals or synthetic diamond seed crystals may be used effectively although the natural diamond seed crystals are preferred.

It has also been noted that growth of diamond seed crystals by either or both of two mechanisms occurs. First, there is growth by deposition of carbon which is or becomes of the diamond form. Second, adjacent crystals appear to grow together under the conditions of this invention.

It is not necessary that the gas and seeds be at the same temperature. When using induction heating, it is particularly easy to have the seed crystals considerably warmer than the gaseous source of carbon flowing over the seeds. This can be useful in minimizing graphite deposition on the quartz parts of the deposition chamber and minimizing the vaporization of $SiO_2$, etc., from the walls of the chamber.

An alternate method of obtaining a flux of carbon containing molecules impinging on the surface of the seed crystals, e.g. diamond seed crystals, is by the use of a molecular beam. This technique requires the use of extremely low-static pressures, e.g., on the order of $10^{-8}$ (Torr.). Another related method which may be employed is the use of a mass spectrometer which will provide a beam of charged carbon containing species for impingement on the seed crystals. These species may be fragments of hydrocarbon molecules.

What is claimed is:

1. A process for growing diamond which comprises contacting a seed crystal of diamond, silicon carbide or boron nitride with a gas selected from the group consisting of methane, dichloromethane, chloroform, and carbon tetrachloride at a temperature in the range of from 80° to 1,450° C. and a pressure not exceeding $1 \times 10^{-2}$ Torr.

2. A process in accordance with claim 1 in which the temperature is in the range of 1,030° to 1,250° C.

3. A process in accordance with claim 1 in which the pressure is in the range of $1 \times 10^{-8}$ to $1 \times 10^{-2}$ (Torr.).

4. A process in accordance with claim 1 in which the gas consists essentially of methane, dichloromethane, chloroform, or carbon tetrachloride and molecular hydrogen.

6. A process in accordance with claim 1 in which the gas consists essentially of a compound of carbon selected from the group consisting of methane, dichloromethane, and carbon tetrachloride and helium.

7. A process in accordance with claim 1 in which the compound of carbon is methane.

8. A process in accordance with claim 1 in which the gas consists essentially of methane, dichloromethane, chloroform, or carbon tetrachloride and a doping agent.

9. A process in accordance with claim 8 in which the doping agent is an organo-aluminum compound.

10. A process in accordance with claim 8 in which the doping agent is a compound of boron.

11. A process in accordance with claim 10 in which the compound of boron is diborane.

12. A process in accordance with claim 1 in which the seed crystal is diamond seed crystal.

13. A process for growing diamond which comprises contacting a seed crystal of diamond, silicon carbide or boron nitride with a gas consisting essentially of an oxygen-free compound of carbon selected from the group consisting of methane, dichloromethane, chloroform, and carbon tetrachloride, which gas is free of molecular oxygen, at a temperature in the range of from 800° to 1,450° C. and a pressure not exceeding $1 \times 10^{-2}$ Torr.

14. A cyclic growth process performed in a single vacuum system including the steps of:
  a. growing diamond on seed crystals of diamond, silicon carbide or boron nitride in accordance with the process of claim 1;
  b. cleaning off graphite from said seed crystals by reaction with oxygen; comprising the steps of discontinuing the diamond growing step, introducing an oxygen-containing gas into the system and contacting said seed crystals with said oxygen-containing gas for a period between 0.1 to 10.00 hours at a temperature of from 800° to 1,400° C. and a pressure of from $1 \times 10^{-3}$ to 1.0 Torr;
  c. discontinuing the oxygen cleaning step and removing $O_2$ and $H_2O$ by evacuating the system; and
  d. repeating the cycle.

* * * * *

UNITED STATES PATENT OFFICE
CERTIFICATE OF CORRECTION

Patent No. 3,630,679                    Dated December 28, 1971

Inventor(s) John C. Angus

It is certified that error appears in the above-identified patent and that said Letters Patent are hereby corrected as shown below:

Column 12, Line 2, "80°" should read -- 800° --.

Column 12: Claim 5 has been omitted. It should read:

5. A process in accordance with Claim 1 in which the gas consists essentially of a mixture of compounds of carbon selected from the group consisting of methane, dichoromethane, and carbon tetrachloride.

Signed and sealed this 13th day of June 1972.

(SEAL)
Attest:

EDWARD M. FLETCHER, JR.　　　　　　　ROBERT GOTTSCHALK
Attesting Officer　　　　　　　　　　　Commissioner of Patents